(12) United States Patent
Yamamuro et al.

(10) Patent No.: US 7,120,167 B1
(45) Date of Patent: Oct. 10, 2006

(54) BROADCASTING SYSTEM AND ITS METHOD

(75) Inventors: Keisei Yamamuro, Moriguchi (JP); Yasuyuki Sonoda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1195 days.

(21) Appl. No.: 09/585,345

(22) Filed: Jun. 2, 2000

(30) Foreign Application Priority Data

Jun. 3, 1999 (JP) .................................. 11-155890
Jun. 2, 2000 (JP) ............................. 2000-166754

(51) Int. Cl.
H04H 1/04 (2006.01)
H04J 1/00 (2006.01)

(52) U.S. Cl. ...................................... 370/487

(58) Field of Classification Search ................ 370/487, 370/486, 217, 254, 539, 471, 352, 394–396, 370/537, 389, 312; 455/61, 102, 143, 65, 455/3.1; 375/216, 61, 134, 232, 132, 110, 375/240.25, 240.26, 240.27, 240.1, 240; 386/65; 714/746; 711/162, 161; 713/201, 713/187, 164, 200; 709/226, 217, 223, 247, 709/219, 225, 319, 224; 348/460, 473–476, 348/387.1, 385.1, 423.1, 571, 558, 554, 384.1; 358/462; 382/186, 209, 260, 233, 254, 232; 725/91, 71

See application file for complete search history.

(56) References Cited

U.S. PATENT DOCUMENTS

| | | | | |
|---|---|---|---|---|
| 5,008,949 | A * | 4/1991 | Arimoto ..................... | 382/233 |
| 5,416,774 | A * | 5/1995 | Shigematsu et al. ........ | 370/312 |
| 5,502,497 | A * | 3/1996 | Yamaashi et al. ........... | 348/473 |
| 5,781,184 | A * | 7/1998 | Wasserman et al. ........ | 348/571 |
| 6,275,989 | B1 * | 8/2001 | Broadwin et al. ........... | 725/37 |
| 6,334,001 | B1 * | 12/2001 | de Queiroz et al. ........ | 382/233 |
| 6,338,096 | B1 * | 1/2002 | Ukelson ..................... | 719/319 |
| 6,353,930 | B1 * | 3/2002 | Shimoji et al. ............. | 725/110 |
| 6,580,462 | B1 * | 6/2003 | Inoue et al. ................ | 348/460 |
| 6,600,870 | B1 * | 7/2003 | Okamoto et al. ........... | 386/65 |
| 6,615,381 | B1 * | 9/2003 | Fukuda et al. ............. | 714/746 |
| 6,674,477 | B1 * | 1/2004 | Yamaguchi et al. ..... | 348/387.1 |

(Continued)

FOREIGN PATENT DOCUMENTS

JP  9-251761  9/1997

OTHER PUBLICATIONS

English Abstract of above Japanese reference.

*Primary Examiner*—Chi Pham
*Assistant Examiner*—Prenell Jones
(74) *Attorney, Agent, or Firm*—Greenblum & Bernstein, P.L.C.

(57) ABSTRACT

A sorting section 64 in a restoration section 76 sorts out a packet for an intended service from a transport stream received according to the control of a reception control section 66. The sorted out packet is provided to an output section 70 and restored to NTSC signals. An audiovisual output section 72 (such as a TV set) receives the signals and outputs images and voices. The reception control section 66 acquires information on the type of contents chosen out of the transport stream through the sorting section 64, and further compares the contents type information with restorable contents type information recorded in a restorable contents type information recording section 68. Then, a determination is made whether or not the contents intended for restoration are restorable. Depending on the determination, the manner of process applied to the contents is changed. For example, the restoration of the contents is interrupted.

25 Claims, 28 Drawing Sheets

U.S. PATENT DOCUMENTS 6,757,911 B1 * 6/2004 Shimoji et al. ............. 725/136
6,782,132 B1 * 8/2004 Fogg .......................... 382/232
6,891,859 B1 * 5/2005 Hyakutake .................. 370/486

* cited by examiner

FIG.2

```
<html>
<head>
<style type="text/css">
 #img1{position:absolute;left:50px;
    top:300px;width:300px;height:500px;}
 #img2{position:absolute;left:400px;
    top:300px;width:300px;height:500px;}
 #img3{position:absolute;left:700px;
    top:300px;width:300px;height:500px;}
</style>
</head>
<body>
    <object id="img1"type="image/png"
        src= "http://www/dirA/0001/s1.png"
        alt= " THIS IMAGE IS A PNG FILE " >
    </object>
    <object id="img2"type="image/gif"
        src= "http://www/dirA/0001/s2.gif"
        alt= " THIS IMAGE IS A GIF FILE " >
    </object>
    <object id="img3"type="image/jpeg"
        src= "http://www/dirA/0001/s3.jpeg"
        alt= "  THIS IMAGE IS A JPEG FILE " >
    </object>
</body>
</html>
```

- 201a (style rule for #img1)
- 201 (entire `<style>` block)
- 202a (first `<object>` block for img1)
- 202 (entire body with objects)

FIG.7A

CONTENTS TYPE INFORMATION

| 1 | 1 | 1 | 1 | ... | 0 |
|---|---|---|---|-----|---|

PNG XML GIF JPEG

FIG.7B

RESTORABLE CONTENTS TYPE INFORMATION

| 1 | 0 | 0 | 0 | ... | 0 |
|---|---|---|---|-----|---|

PNG XML GIF JPEG

FIG.8

PMT

| Syntax | No. of bits | Macmonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     carrent_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0;i<N;i++) { | | |
|         descriptor() | | |
|     } | | |
|     for(i=0;i<N1;i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0;i<N2;i++) { | | |
|             descriptor() | | |
|         } | | |
|     } | | |
|     CRC_32 | 32 | rpchof |
| } | | |

DESCRIPTOR OF PMT

| DATA STRUCTURE | NUMBER OF BITS | BIT LINE DESCRIPTION |
|---|---|---|
| data_component_descriptor () { | | |
|    descriptor_tag | 8 | uimsbf |
|    descriptor_length | 8 | uimsbf |
|    descriptor_component_id | 16 | uimsbf |
|    for(i=0;i<N;i++) { | | |
|       additional_data_component_info | 8 | uimsbf |
|    } | | |
| } | | |

| DATA STRUCTURE | NUMBER OF BITS | BIT LINE DESCRIPTION |
|---|---|---|
| additional_html_info () { | | |
|    bit_flag_length | 8 | uimsbf |
|    for(i=0;i<bit_flag_length;i++) { | | |
|       bit_flag | 8 | uimsbf |
|    } | | |
| } | | |

FIG.12 RECEPTION PROCESS

FIG.17

PNG, GIF, JPEG

FIG.21

STRUCTURE OF DII

| DATA STRUCTURE | NUMBER OF BITS | BIT LINE DESCRIPTION |
|---|---|---|
| DownloadInfoIndication() { | | |
|     dsmccMessageHeader() | | |
|     downloadId | 32 | uimsbf |
|     blockSize | 16 | uimsbf |
|     windowSize | 8 | uimsbf |
|     ackPeriod | 8 | uimsbf |
|     tCDownloadWindow | 32 | uimsbf |
|     tCDownloadScenario | 32 | uimsbf |
|     compatibilityDescriptor() | | |
|     numberOfModules | 16 | uimsbf |
|     for(i=0;i<numberOfModules;i++) { | | |
|         moduleId | 16 | uimsbf |
|         moduleSize | 32 | uimsbf |
|         moduleVersion | 8 | uimsbf |
|         moduleInfoLength | 8 | uimsbf |
|         for(i=0;i<moduleInfoLength;i++) { | | |
|             moduleInfoByte | 8 | uimsbf |
|         } | | |
|     } | | |
|     privateDataLength | 16 | uimsbf |
|     for(i=0;i<privateDataLength;i++) { | | |
|         privateDataByte | 8 | uimsbf |
|     } | | |
| } | | |

| DATA STRUCTURE | NUMBER OF BITS | BIT LINE DESCRIPTION |
|---|---|---|
| control_data_byte() { | | |
|     bit_flag_length | 8 | uimsbf |
|     for(i=0;i<bit_flag_length;i++) { | | |
|         bit_flag | 8 | uimsbf |
|     } | | |
| } | | |

FIG.24 HARDWARE STRUCTURE OF RECEIVING DEVICE

FIG.25

CONTENTS TYPE INFORMATION
AND ACQUISITION LOCATION INFORMATION

| | | |
|---|---|---|
| PNG | 1 | http://www.mel.co.jp/PNG |
| XML | 0 | — |
| GIF | 1 | http://www.mel.co.jp/GIF |
| | ----- | ----- |

FIG.27

| CONTENTS TYPE INFORMATION | ACQUISITION LOCATION INFORMATION | NECESSARY CONDITION INFORMATION |
|---|---|---|
| PNG | http://www.mei.co.jp/PNG | 300K |
| XML | http://www.mei.co.jp/GIF | 150K |
| ----- | ----- | ----- |

BROADCASTING SYSTEM AND ITS METHOD

CROSS-REFERENCE TO RELATED APPLICATIONS

The entire contents of the disclosure including specifications, claims, drawings, and abstract of the following are incorporated in this application by reference: a Japanese patent applications No. 166754 dated Jun. 2, 2000, and No. 155890 dated Jun. 3, 1999.

FILED OF THE INVENTION

This invention relates to a broadcast system, in particular the one that is intended to increase the processing speed by eliminating unnecessary processes on the receiving side.

BACKGROUND OF THE INVENTION

In the digital broadcast using the satellite and ground waves, data broadcast is in practice as attached to the ordinary audiovisual programs. This makes it possible to provide viewers with interactive services. There are also cases in which the data broadcast alone is provided as independent programs.

FIG. 1 shows the overview of the data broadcast. Contents 2 include a plurality of content elements CE1 to CEn. Each of the content elements CE1 to CEn is provided with a table ID. The same set of content elements (namely the contents 2) are repeatedly broadcasted.

Each content element is subdivided into a plurality of packets (i.e. packetized) and broadcast. On the receiving device side, the subdivided packets are reorganized to obtain the content elements.

The content element CE1 is described for example in the HTML language. Therefore, the table ID of an image to be displayed or the table ID of the link location are described.

On the receiving device side, first the content element CE1 is acquired and interpreted, and an image to be used for reference is acquired according to the table ID. However, in the case a content element having the table ID intended to acquire is the one that has been sent already out of a set of content elements, the content element cannot be acquired. However, the same contents 2 are transmitted repeatedly, the content element having the intended table ID can be acquired out of the next set of content elements.

Also in the case an operator of the receiving device chooses and determines the link location by a remote controller or the like, the content element of the link location included in a set of content elements is acquired in the same manner as described above.

The repeated broadcast of a set of content elements as described above makes it possible on the receiving device to perform the process of linking or reference without storing all the content elements.

If the memory capacity on the receiving device side permits, it may also be arranged that all the contents in a set are once stored to perform the process of linking or reference.

Concrete examples of contents for use in the data broadcast will be described using the HTML document shown in FIG. 2. The HTML document can be displayed using the browser application program as shown in FIG. 3. That is to say, the browser application interprets the contents of the HTML document described shown in FIG. 2 and displays the images as shown in FIG. 3.

The lines 201 in FIG. 2 specify the position and the size of an object. At the time of browse-display, the lines 201a for example specify; a position 50 pixels from the left and 300 pixels from the top; and a size of a width of 300 pixels and a height of 500 pixels. The lines 202 in FIG. 2 specify concretely which objects are to be displayed according to the lines 201, and describe the operation when objects are chosen. For example, the lines 202a specify to display an image file in http://www/dirA/001/s1.png (table ID) and are described to display in the vicinity of the image file "This image is in PNG file."

To restore the above contents using HTML form, the receiving device must acquire a necessary packet out of a stream sent from the broadcast station side in packets (referred to as the transport stream), reorganize the content elements, and further restore content elements of image data and the like that are used for reference.

However, there are many technical standards for the image data and the like, depending on the receiving device, not all the types of image data can be restored. In other words, when a receiving device is not provided with the function (hardware circuit and/or software) for restoring the type of the image data in question, the image data of that type cannot be restored.

In spite of the above situation, the receiving device cannot determine whether or not the image data in question can be restored unless the receiving device acquires the packet, that restores the content elements (See FIG. 2), and acquires the description of the restored content elements (See lines 202a in FIG. 2). That is to say, whether or not the image data can be restored can be determined only after acquiring the extension of the file name of the image data being used for reference.

Depending on the image data, there may be a case in which the data of a different version cannot be restored. In such a case, the extension only cannot determine whether or not the restoration is possible. In such a case, the impossibility of restoration is learned only after the image data are acquired and transferred to the application that performs the restoration. There is also the possibility of an incorrect operation as the case may be.

In any of the above cases, many processes must be performed before it is determined that image data are included that cannot be restored. There is also a problem for example when a process is to be performed in which all or part of contents are not displayed when it is determined that the image data partially includes those that cannot be displayed, the processes up to that determination become useless and also much time is consumed.

The above problems occur also in the case a method is employed in which the processes are performed after a set of content elements are once stored.

There may be also a case in which even if the data can be restored, the data cannot be acquired in the first place because of too large in a size of the data. In such a case too, the processes performed end up in waste.

The present invention has an object of providing a broad cast system that makes it possible to determine easily whether or not the contents can be restored in an early stage of data acquisition in view of the above-mentioned problems.

Another object of the present invention is to provide a broadcast system that makes it possible to determine before acquiring the data whether or not the data can be acquired.

SUMMARY OF THE INVENTION (1) This invention relates to a digital broadcast system by which in a broadcast device multiplexes and broadcasts contents and the information on type of the contents, and a receiving device performs the process of restoring the contents, characterized in that a determination is made on the basis of the information on the type of the contents whether or not the contents can be restored, and according to the determination, the process to be applied to the contents is changed.

(4) The broadcast system of the present invention is characterized in that a set of contents are repeatedly broadcast, and on the receiving side, only the contents that are selected out of the set of contents are restored and displayed. Therefore, linking process among the content elements can be realized without storing a plural number of content elements.

(5) The broadcast system of this invention is characterized in that information on the type of contents includes information on the type of a plurality of content elements contained in corresponding contents. Therefore, information on the type corresponding to a plurality of content elements can be acquired quickly.

(6) The broadcast system of this invention is characterized in that, in the case it is determined that any of a plurality of content elements contained in corresponding contents cannot be restored, the receiving device not performs restoration of the entire contents. Therefore, a useless process is avoided on the basis of the determination of impossibility of restoration.

(7) The broadcast system of this invention is characterized in that, in the case any of a plurality of content elements contained in corresponding contents cannot be restored, the receiving device not performs restoration of only the contents that cannot be restored. Therefore, a useless process is avoided while outputting as much contents as possible.

(8) The broadcast system of this invention is characterized in that handling information that is made to correspond to the information on the type of contents is transmitted from the broadcast device, and when a determination is made on the basis of the information on the type of contents that the contents cannot be restored, the receiving device determines either to restore the contents in an incomplete state and to output them for display or not to restore at all and not to output them for display.

Therefore, the process, for the case of a determination that the contents cannot be restored, can be determined based on the handling information. That is to say, it is possible to specify the manner of process from the transmitter side so that the intention of a contents creator is reflected on the manner of the process.

(9) The broadcast system of this invention is characterized in that pieces of information on the types corresponding to a plurality of contents are collectively transmitted. Therefore, information on the types of a plurality of contents can be acquired quickly.

(10) The broadcast system of this invention is characterized in that a receiving device records and holds in advance the data of the type of the contents that can be restored, and determines whether or not contents received can be restored by comparing the information on the type of restorable contents with the information on the type of contents received. Therefore, restorability determination can be made easily, and even when a new type of contents become restorable, the only thing that must be done is to change the information on the type of restorable contents.

(13) The digital broadcast system of this invention is characterized in that a broadcast device multiplexes and broadcasts; contents, the information on the type of contents, and information on the location from where the program for restoring the contents is to be acquired, and that a receiving device, when restoring the contents, determines on the basis of the information on the type of contents whether or not the contents are restorable and, if not, acquires the program according to the acquisition location information, and restores the contents.

Therefore, even if the contents are not restorable, it is possible to acquire a program necessary for the restoration and to practice the restoration.

(14) The digital broadcast system of this invention is further characterized in that information on conditions required of the receiving device side for acquiring a program is broadcasted. Therefore, whether the program can be acquired to the end is learned in advance before acquiring the program.

(19) The digital broadcast system of this invention is characterized in that the acquisition location information is the URL (uniform resource locator) on the Internet. Therefore, a required program can be acquired through the Internet.

(20) The digital broadcast system of this invention is characterized in that the acquisition location information is the information for specifying a program sent to come through broadcast.

(26) The digital broadcast system of this invention is characterized in that a broadcast device broadcasts acquisition location information for digital information to be downloaded on the receiving device side and also broadcasts information on the conditions necessary for downloading the digital information, and the receiving device, before starting downloading the digital information, whether or not the digital information can be downloaded is determined on the basis of the information on the required conditions.

Therefore, it is possible to determine in advance whether the digital information in question can be downloaded before downloading the digital information.

(29) The digital broadcast system of this invention is characterized in that the acquisition location information is the URL on the Internet where digital information is recorded. Therefore, it is possible to learn in advance whether or not the information can be downloaded at the time of acquiring the digital information through the Internet.

(30) The digital broadcast system of this invention is characterized in that the acquisition location information is the information for specifying digital information delivered through broadcasting. Therefore, it is possible to learn in advance whether or not the information can be downloaded at the time of acquiring the digital information through the broadcasting.

The term "restore" or "restoration" as used herein refers to change contents, that cannot be reproduced if they are outputted as they are coded or encrypted, or contents that cannot be reproduced without using a corresponding program such as JAVA, into the state that can be reproduced.

The term "download" refers to acquire data from the outside and record them temporarily or permanently.

The term "receiving device" refers to a device that performs at least the restoration process for contents. The concept of this term also includes a device so-called a set-top box, and a TV set with built-in function of a set-top box.

The phrase "recording medium with a program recorded" refers to a ROM, a RAM, a flexible disk, a CD-ROM, a memory card, a had disk, etc. on which programs are recorded. The concept of this term also includes communication media such as the telephone lines and transmission routes. The concept also includes not only recording media such as the hard disk with which a program recorded thereon is directly executed but also recording media such as CD-ROM recording a program to be once installed on a hard disk or the like and then executed. The term "program" as used herein refers not only to a program that can be directly executed but also to a program of a source type, compression-processed program, coded program, etc.

The features, other objects, applications, and advantages of the present invention will become clear in reference to the following embodiments and drawings.

BRIEF DESCRIPTION OF DRAWINGS

FIG. 2 shows an example of HTML data.

FIG. 7A shows information on the type of contents.

FIG. 7B shows information on the type of restorable contents.

FIG. 8 shows the structure of a PMT.

FIG. 9 shows the structure of a PMT in detail.

FIG. 17 shows information on the type of contents in another form.

FIG. 21 shows the structure of DII.

FIG. 25 shows information on the type of contents and information on acquisition locations.

FIG. 27 shows information on necessary conditions.

DETAILED DESCRIPTION OF PREFERRED EMBODIMENTS

1. First Embodiment 1.1 Broadcast Unit

Figure 1:
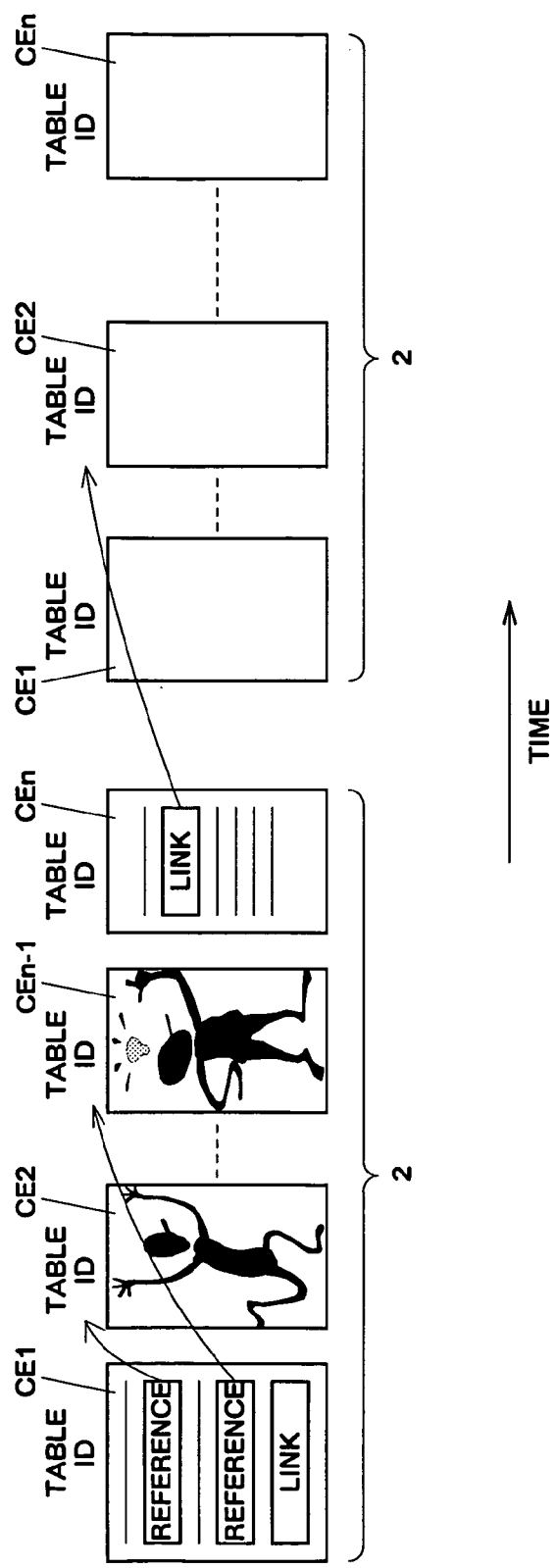
FIG. 1 is a view illustrating a manner of data transmission in a data broadcast.
Figure 3:
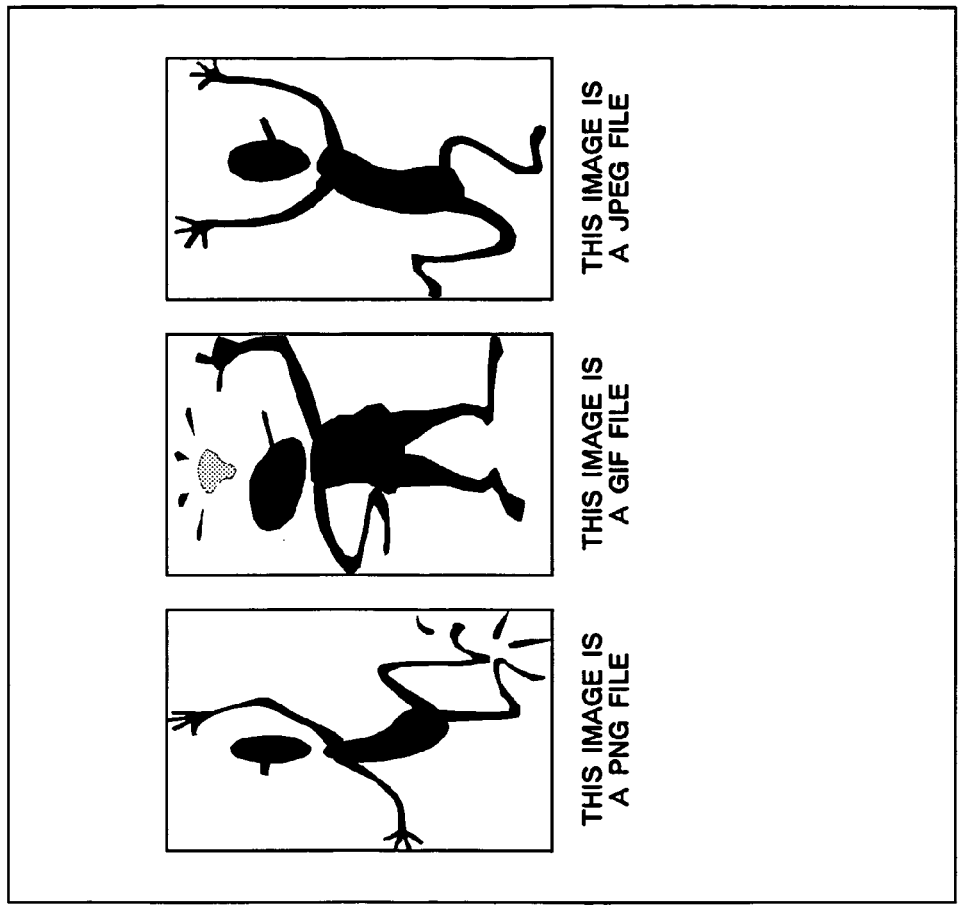
FIG. 3 is a view illustrating displayed images of the data shown in FIG. 2.
Figure 4:
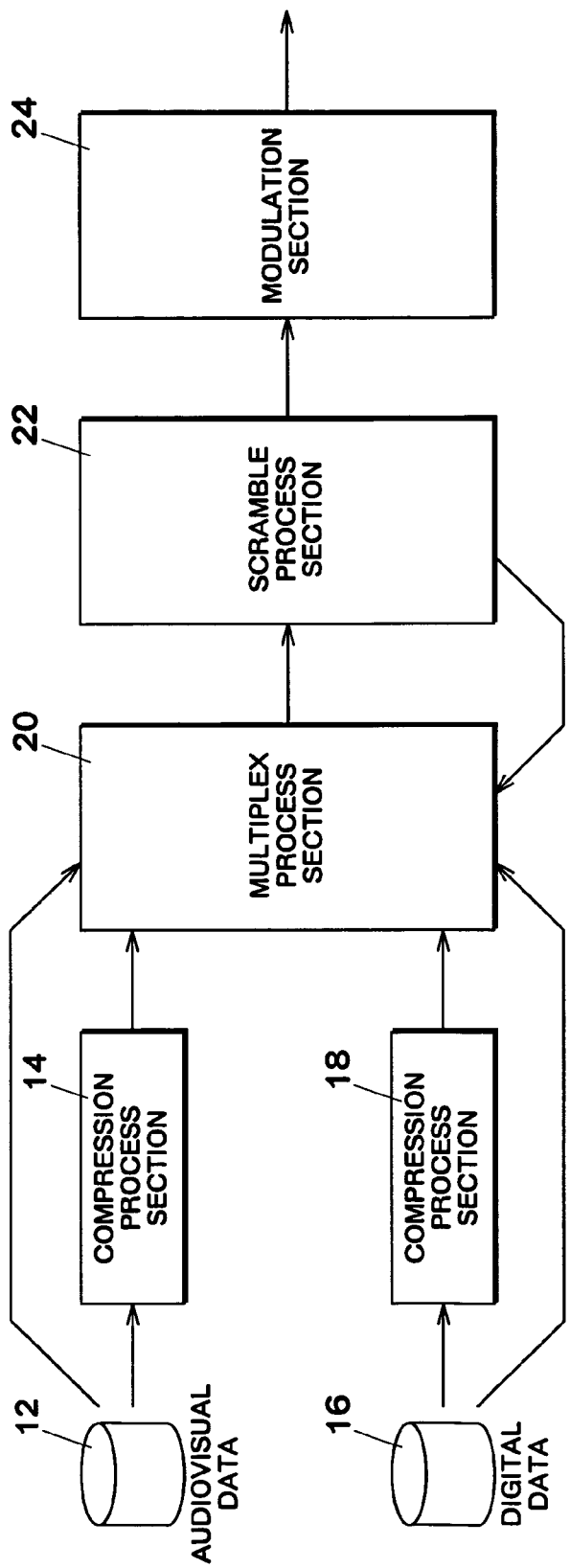
FIG. 4 is a schematic view showing the construction of a broadcast device.

FIG. 4 is a schematic view showing the structure of a broadcast device 10 as an embodiment of the invention. In this embodiment, contents of a broadcast program is constituted with ordinary audiovisual data attached with digital data such as HTML. The programs may also be constituted with only digital data.

The audiovisual data 12 are compressed with a compression process section 14 and given to a multiplex process section 20. The digital data 16 such as HTML data are compressed with a compression process section 18 and provided to the multiplex process section 20.

Although contents of other services are also provided to the multiplex process section 20, they are not shown in the figure. The multiplex process section 20 arranges audiovisual data and digital data of a plural number of services being provided in packets and multiplexes them. In that case, control data for multiplexing are created during the process.

The data arranged in packets and multiplexed are scramble-processed in a scramble process section 22. The key used in the scramble process is provided to the multiplex process section 20 and is included as part of the control data.

The scramble-processed data are modulated in a modulation section 24 and broadcasted as a transport stream via a broadcast satellite.

Figure 5:
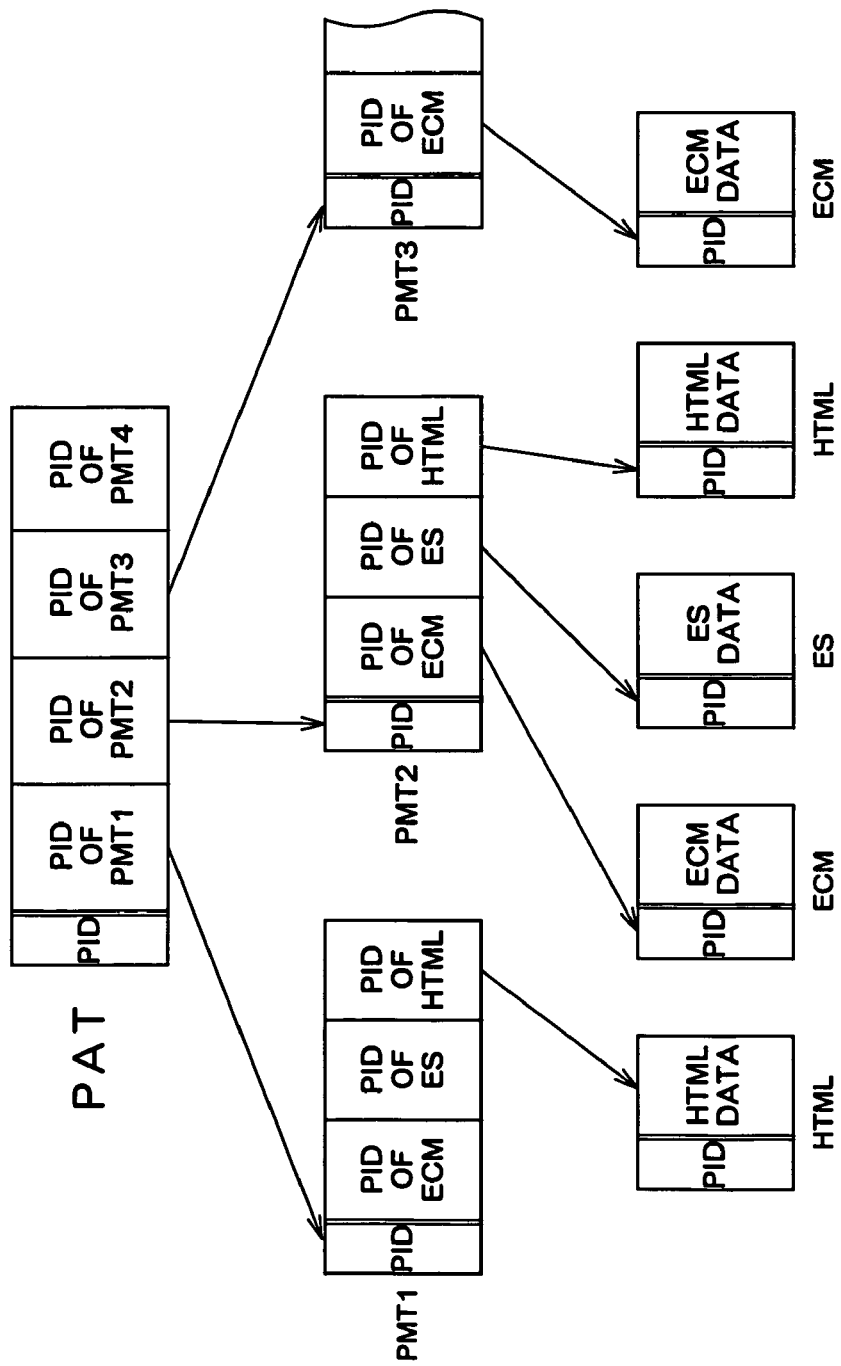
FIG. 5 is a diagram showing a structure of packets.

FIG. 5 is a diagram showing a state of packet-multiplexing of a transport stream in which four services are multiplexed. Packet IDs for identifying control data PMT1–PMT4 for respective services are described to control data PAT. For example, a packet ID for identifying the contents (audiovisual data and HTML data) constituting a service in question is described to the control data PMT2. Moreover, a packet ID for identifying ECM data in which key data for unscrambling the contents is described. Therefore, by acquiring, unscrambling and reading the control data PMT2, it is possible to acquire audiovisual data and HTML data included in a service in question.

Figure 6:
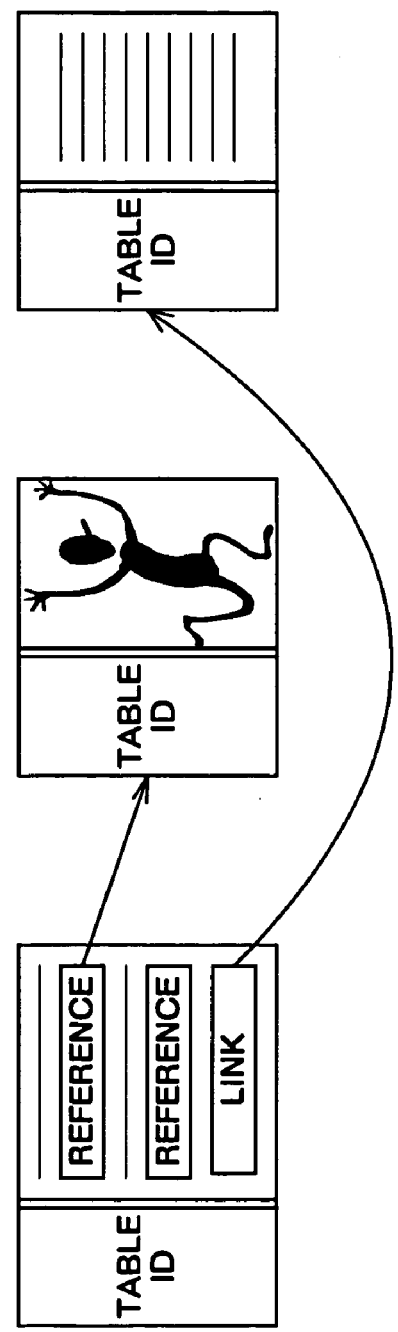
FIG. 6 shows a method of performing reference and linking to the HTML data.

References and linking among the HTML data are realized as shown in FIG. 6. To the HTML data is given a specific packet ID as described above. However, respective contents of the HTML data (including image data and the like) are given to table IDs. Using the table IDs, reference and linking are reallized.

In this embodiment, information on the type of contents as shown in FIG. 7A is described in the control data PMT. The information on the type of contents is the one that describes the type of image data being used for reference in the HTML contents corresponding to the PMT. In this embodiment, the information on the type of contents is shown in the form of a bit flag. If the first bit is in "1," the contents include PNG type of image data, which means that a PNG decoder is required on the receiving device side. If the first bit is in "0," the contents do not include PNG type of type of image data, which means that no PNG decoder is required on the receiving device side.

Each of the succeeding bits shows like the above that data of XML type (XML purzor is required), data of GIF type (GIF decoder is required), data of JPEG type (JPEG decoder is required) are included.

FIG. 8 shows the data structure of the control data PMT. In the control data PMT, a description region, "descriptor( ) 50", is prepared. This embodiment is arranged to describe the information on the type of contents in the descriptor( ) 50. It may also be arranged to describe it in other region as a matter of course. A plural number of descriptors are further described in the descriptor. This example is arranged as shown in FIG. 9 that the information on the type of contents is described in the "additional_data_component_info" in the "data_component_descriptor( )."

For the description of the descriptor in general, refer to ARIB STD-B10, Version 1.2.

The digital data containing the information on the type of contents are broadcasted as described above.

1.2 Receiving Device

Figure 10:
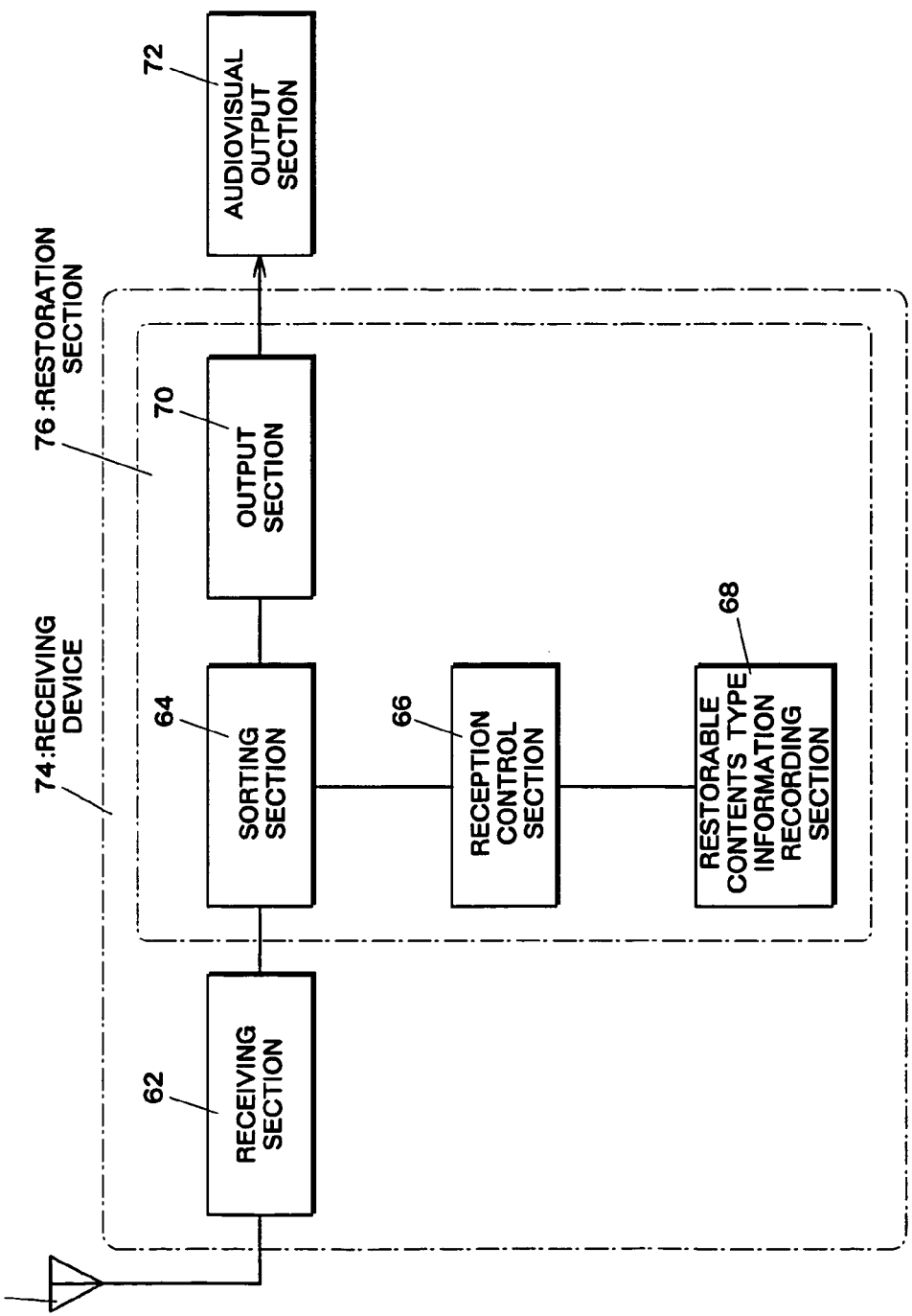
FIG. 10 is a schematic diagram illustrating the entire structure of a receiving device.

FIG. 10 is a schematic diagram illustrating the entire structure of a receiving device as a first embodiment of the present invention. A receiving device 74 in this embodiment is provided with a receiving section 62 and a restoration section 76. The receiving device 74 may also be constituted to include an audiovisual output section 72.

The electromagnetic wave caught with an antenna 60 is demodulated to be a transport stream in a receiving section 62. The transport stream is provided to a restoration section 76. The sorting section 64 in the restoration section 76 selects a packet for an intended service from the transport stream received. The packet chosen is given to an output section 70 and is restored as output signals, for example composite signals such as NTSC signals. The audiovisual output section 72 (such as a TV receiver) receives the output signals and outputs images and voices.

A reception control section 66 acquires the information on the type of contents chosen out of the transport stream through the sorting section 64. Next, the information on the type of contents is compared with information on the type of restorable contents recorded in a restorable contents type information recording section 68. In this way, a determination is made whether or not the contents intended for restoration is restorable and, depending on the determined result, manner of processing the contents is changed; for example the restoration process is stopped.

Figure 11:
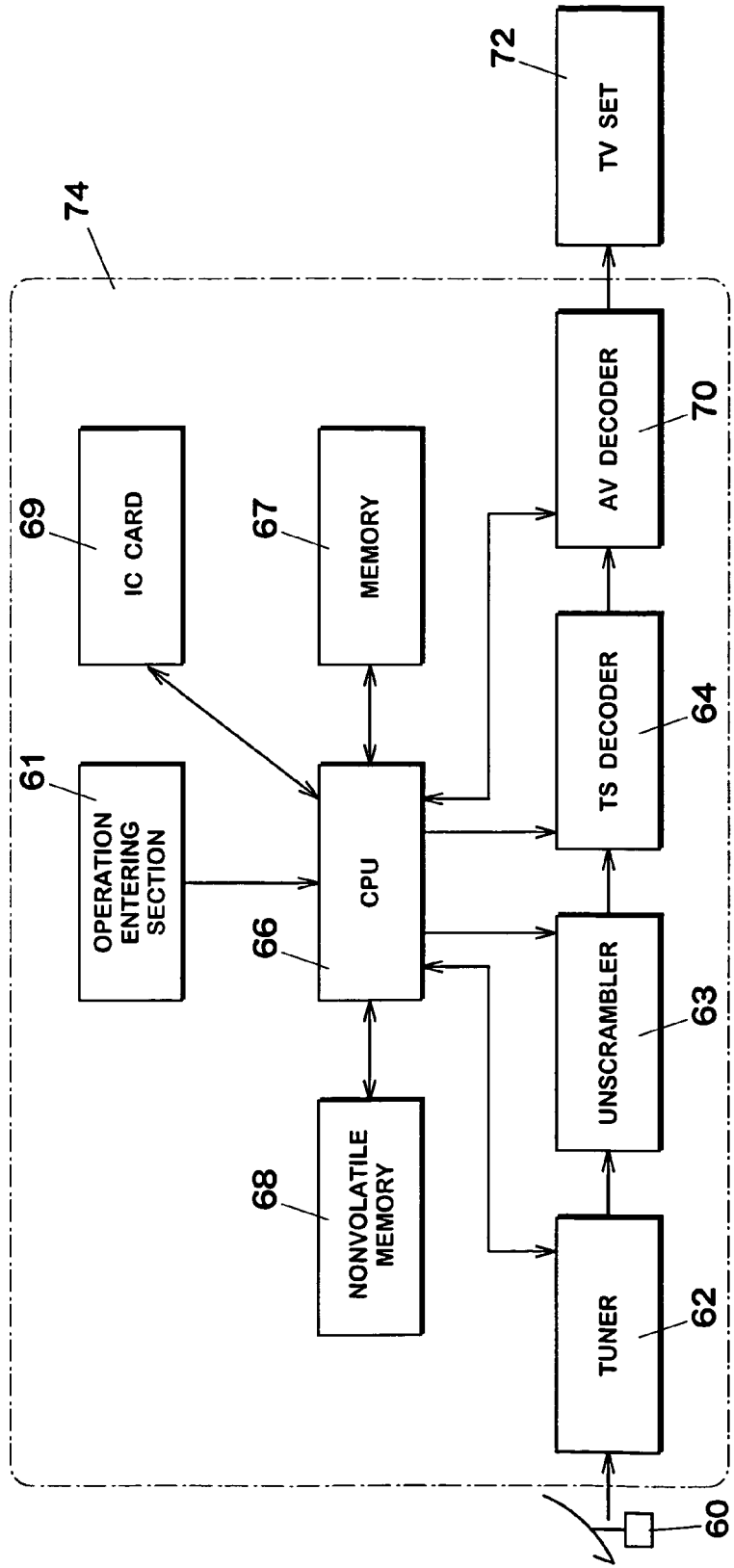
FIG. 11 is a block diagram illustrating the hardware structure of the receiving device.

FIG. 11 is a block diagram illustrating the hardware structure in which the receiving device shown in FIG. 10 is realized by the use of a CPU. The CPU 66 controls various parts according to a program(s) stored in a recording medium, a non-volatile memory 68. An operation entering section 61 receives the operation made by an operator through input buttons or a remote control receiving section provided in the receiving device 74. An unscrambler 63 is for decoding scrambled information. An unscrambling key may be obtained by decoding and reading the ECM data sent to come by broadcast with an IC card 69. A transport stream decoder (TS decoder) 64 forming a sorting section, is for separating an intended packet from the transport stream.

In the non-volatile memory 68 is recorded restorable contents type information shown in FIG. 7B. In FIG. 7B, it is shown that the PNG and the XML are restorable (with "1" recorded) and the GIF and the JPEG are not restorable (with "0" recorded). Namely it is shown that the receiving device is provided with a PNG decoder and an XL parser but not with a GIF decoder and a JPEG decoder.

Figure 12:
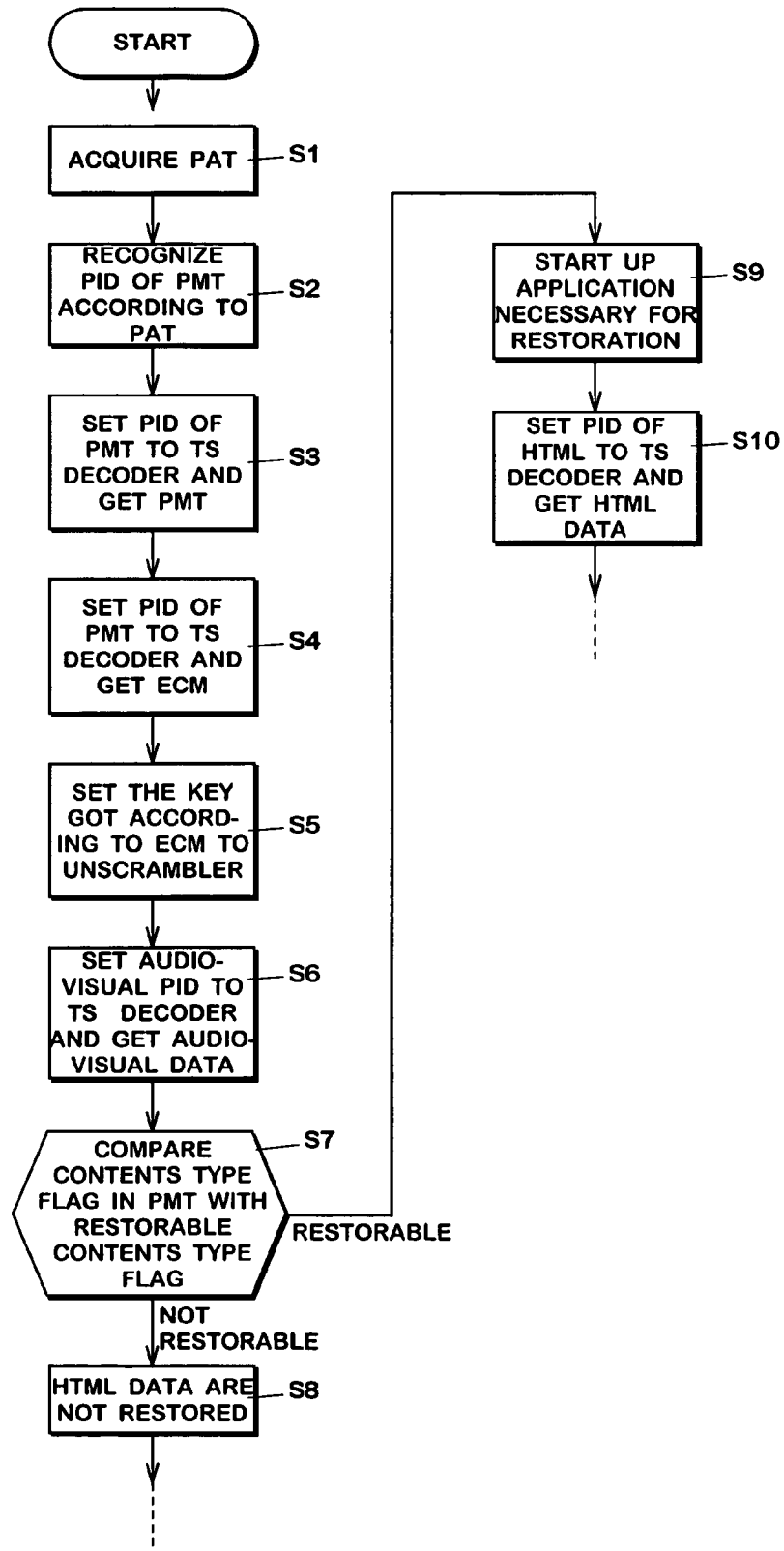
FIG. 12 is a flowchart of the reception process.

FIG. 12 is a flowchart of a program for performing the reception process recorded in the non-volatile memory 68. The CPU 66 controls the tuner 62 to receive an intended transport stream. The packet ID of the control data PAT (hereinafter termed PID) is set to the TS decoder 64. Here, the PID of the PAT is fixed in advance.

The TS decoder 64 then separates the control data PAT and outputs the control data to the memory 67 (step S1). The CPU 66 recognizes the PID of the control data PMT of an intended service according to the control data PAT (step S2; See FIG. 5). The TS decoder 64 then separates the control data PMT and outputs the separated data to the memory 67 (step S3). Then, the CPU 66 recognizes the PID of the control data ECM of an intended service according to the control data PMT, and further sets the PID of the ECM to the TS decoder 64 and acquires the control data ECM (step S4).

Next, the CPU 66 sends the control data ECM to the IC card 69, and acquires a key from the IC card 69, and then sets the key to the unscrambler 63 (step S5). As a result, audiovisual data and HTML data of the intended service are unscrambled.

Then, the CPU 66 sets the PID of the audiovisual data to the TS decoder 64 (step S6). Subsequently, the TS decoder 64 outputs the audiovisual data to an AV decoder 70. As a result, images and voices are outputted on a TV set 72.

Next, the CPU 66 reads a restorable contents flag (See FIG. 7B) recorded on the non-volatile memory 68, and compares it with a contents type flag (See FIG. 7A) contained in the control data PMT. A determination is made whether or not a bit is present where the contents type flag is "1" in spite of the restorable contents type flag being "0" (step S7). In other words, a determination is made whether or not the HTML data received as transmitted contain the type of data that cannot be restored with the receiving device being used.

If it is determined to be restorable, an application necessary for the restoration is started (step S9). For example, when the first bit is in "1," the PNG decoder recorded in the non-volatile memory 68 is started. Next, the CPU 66 sets the PID of the HTML data in the TS decoder 64 (step S10). Then, the TS decoder 64 outputs the HTML data to the memory 67. The CPU 66 interprets the HTML data according to the browser program recorded in the non-volatile memory 68 and outputs the data to the AV decoder 70.

Further, the table ID (See 202a in FIG. 2) of the PNG data being used for reference with the HTML data is set to the TS decoder 64 to acquire PNG data. The PNG data are restored with a PNG decoder and outputted to the AV decoder 70.

In this way, the HTML data and the PNG data are synthesized by overlapping with the audiovisual data and outputted from the AV decoder 70.

Figure 13:
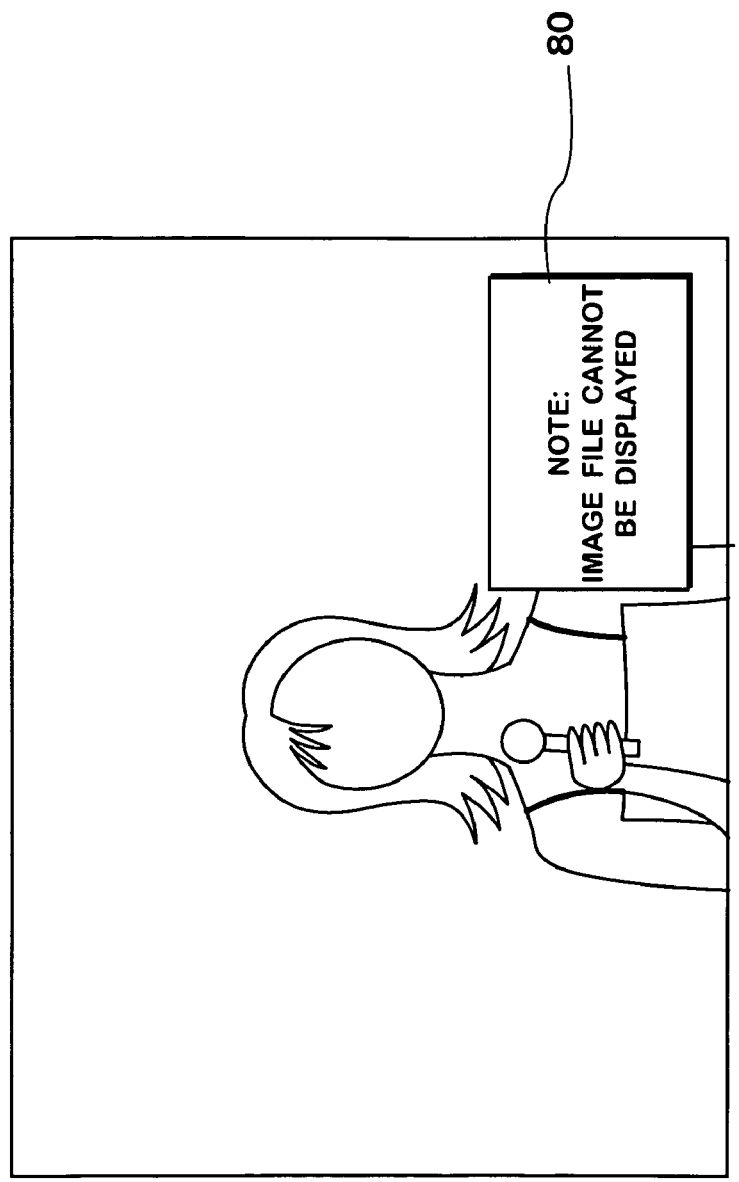
FIG. 13 is a view illustrating a displayed image.

On the other hand, if it is determined in the step S7 that something that cannot be restored has been transmitted and arrived, a restoration process is not performed for the HTML data (step S8). This makes it possible to avoid a useless application startup process. In this case, as shown in FIG. 13, the audiovisual data alone are displayed and in the region where the HTML data are to be displayed is displayed a remark to the effect that the display cannot be made.

Figure 14:
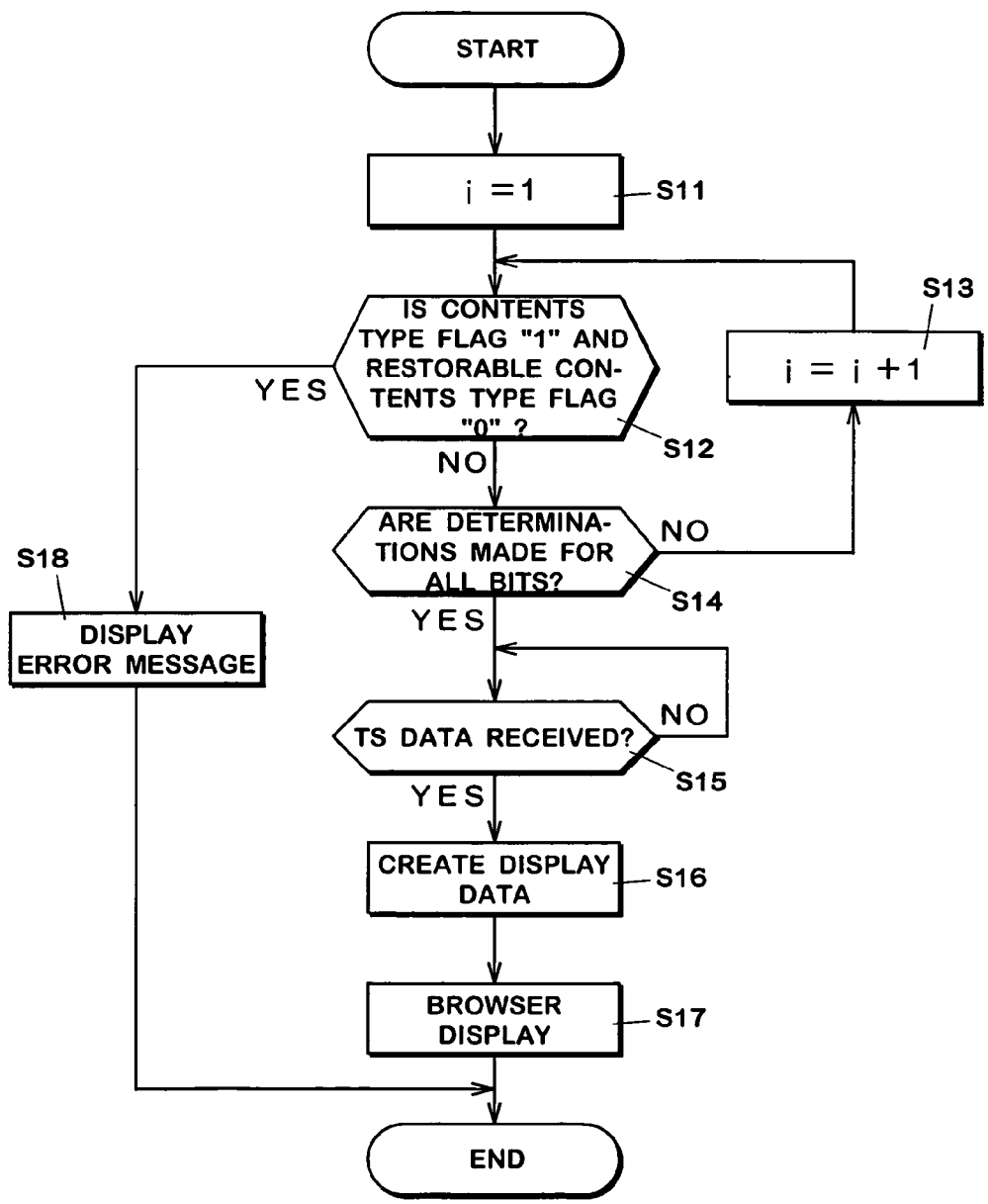
FIG. 14 is a flowchart showing a reception process in detail.

FIG. 14 is a flowchart showing the details of the flag comparison process of the above step S7. As is clear from this flowchart, it is arranged that if there is at least one bit where the contents type flag is in "1," and the restorable contents type flag is in "0," an error message is displayed. It is also arranged that at the time point when it is determined that a contents type that cannot be restored is present, examination of bits thereafter is not performed. This is intended to increase the processing speed.

1.3 Other Embodiments

The above embodiment is arranged that in the case any of the content elements is not restorable, all the HTML data are not restored. However, it may be arranged alternatively that only the restorable content elements are restored.

Figure 15:
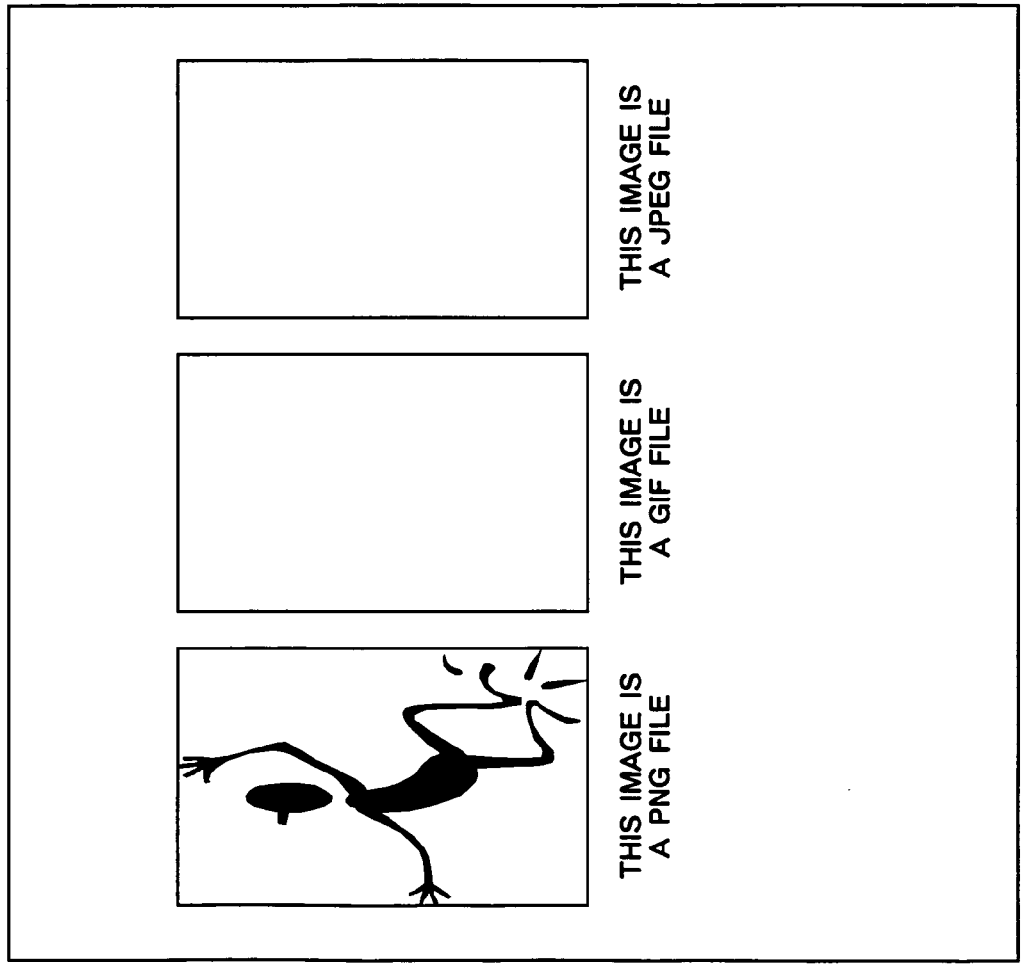
FIG. 15 is a view illustrating displayed images.
Figure 16:
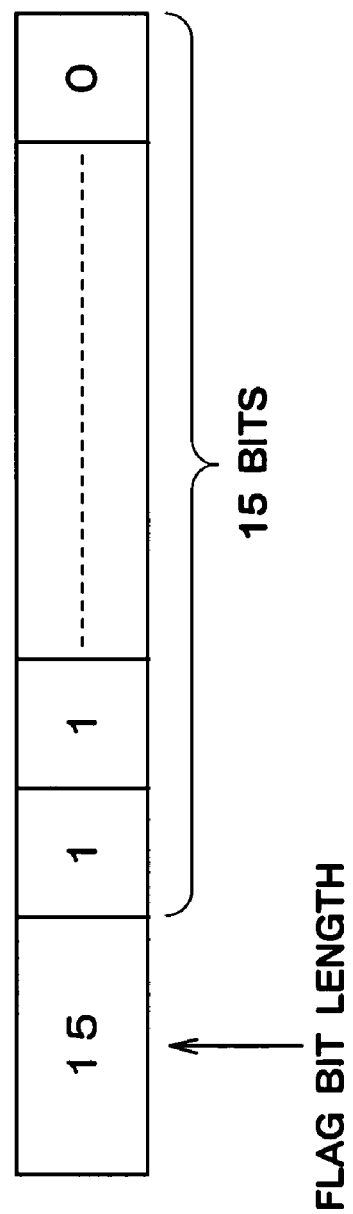
FIG. 16 shows information on the type of contents in variable length.

For example in the case of FIGS. 7A,B, for the HTML data as shown in FIG. 2, display is made shown in FIG. 15. That is, only the text data of the HTML and the restorable PNG data are displayed.

While the above embodiment is arranged to describe the contents type information in the control data PMT, it may also be arranged to describe the information in the control data EIT (Event Information Table). The control data EIT is for describing the information on the program such as the title thereof, airdate and airtime, and contents of the program.

In the above embodiment, a contents type flag of a fixed length (restorable contents flag) is used. However, as shown in FIG. 17, a flag of variable length may be used by describing the flag bit length.

In the above embodiment, the contents type information is represented with the bit flag. However, as shown in FIG. 17, a description of a contents type may be used as the contents type information. In that case, the restorable contents type information is also the description of the contents type. If the contents type described in the contents type information is not present in the restorable contents type information, it may be determined that the restoration cannot be made.

Version information may be included as the contents type. Because, for example, there may be cases in which restoration cannot be made correctly depending on the version even with the same GIF data. Including also the version information in the contents type makes it possible to cope with such a case as described above.

Figure 18:
FIG. 18 shows information on the type of contents with handling information attached.

Furthermore, as shown in FIG. 18, handling information may be added to the contents type information. That the handling information is in "1," shows that if any one of the content elements is not restorable, all the contents are not restored (See FIG. 13). If it is in "0," it shows that only restorable content elements alone are restored (See FIG. 15). This handling information makes it possible to reflect the intention of the contents creator on the broadcast.

While the above embodiment is explained by way of image data, the same explanation is applicable for the audio data, which is also true for the second and later embodiments.

2. Second Embodiment

Figure 19:
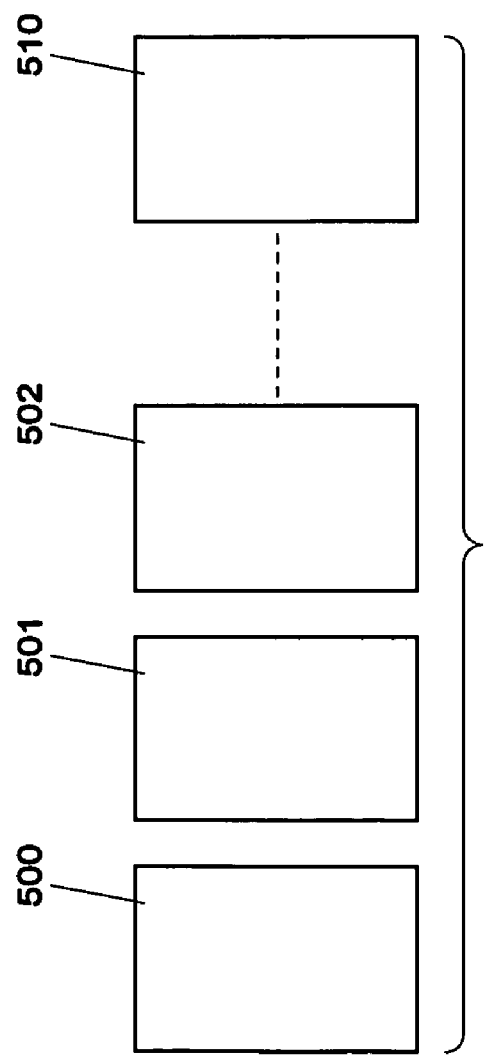
FIG. 19 shows a set of contents.
Figure 20:
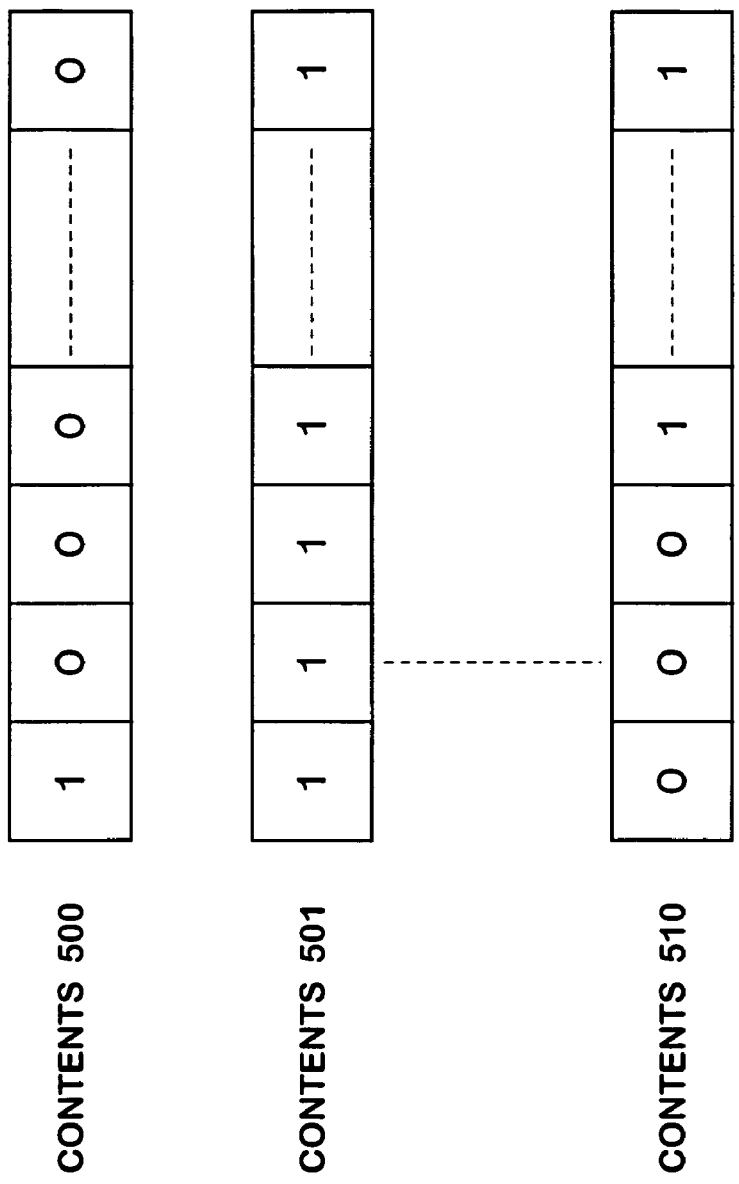
FIG. 20 shows information on the type of contents for each content in FIG. 19.

In the above embodiment, the broadcast device is designed to transmit the contents type information for all the contents that constitute the program. However, it may be arranged as shown in FIG. 19 that, in the case a plural number of contents 500 to 510 are transmitted repeatedly, each of the contents are broadcasted with information on the type of the content described. In other words, information on the type of contents is described for each of the contents as shown in FIG. 20.

In that case, it is preferable to describe the information on the type of contents to the control data DII (Download Information Indication). FIG. 21 shows the structure of the control data DII. This embodiment is arranged to describe the information to the "control_data_byte" in the "moduleInfoByte."

With this embodiment, whether or not display can be made is determined for each of the contents that constitute the program. This enables more detailed control of the display. Here, the flow of process is basically the same as that shown in FIGS. 12 and 14.

3. Third Embodiment

3.1 Receiving Device

Figure 22:
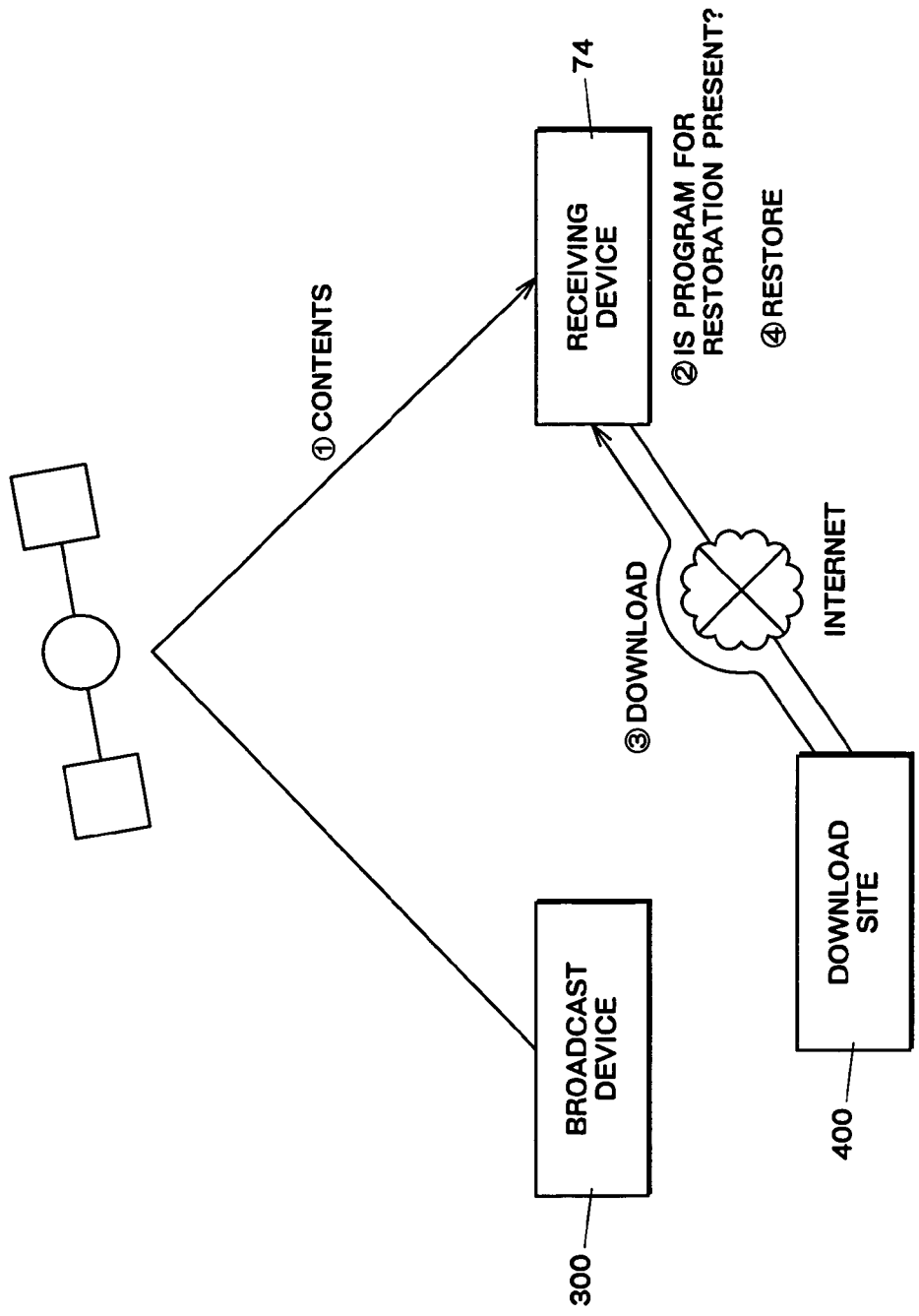
FIG. 22 shows the entire structure of a third embodiment.

FIG. 22 shows the entire structure of a receiving device as a third embodiment of the present invention. Contents are broadcasted from a broadcast device 300, with information on the type of contents and the URL (uniform resources locator; acquisition location information) attached for each of the contents (① in FIG. 22). A receiving device 74, like in the previous embodiment, determines whether or not the receiving device 74 is provided with a program (or hardware) necessary for restoring the contents (②) in the figure). If either one of them is not provided thereto, an access is made to a download site 400 through the Internet according to the URL to download the program necessary for the restoration from the download site (③ in the figure). Using the program, the receiving device 74 restores the contents (④ in the figure). Here, the receiving device 74 updates the information on the type of contents according to the download of the program.

As described above, this embodiment is arranged that the information on the location where the program for restoring the contents of the type in question can be acquired is broadcasted together with the information on the type of the contents. Therefore, it is possible to easily and automatically acquire the program to restore the contents.

Figure 23:
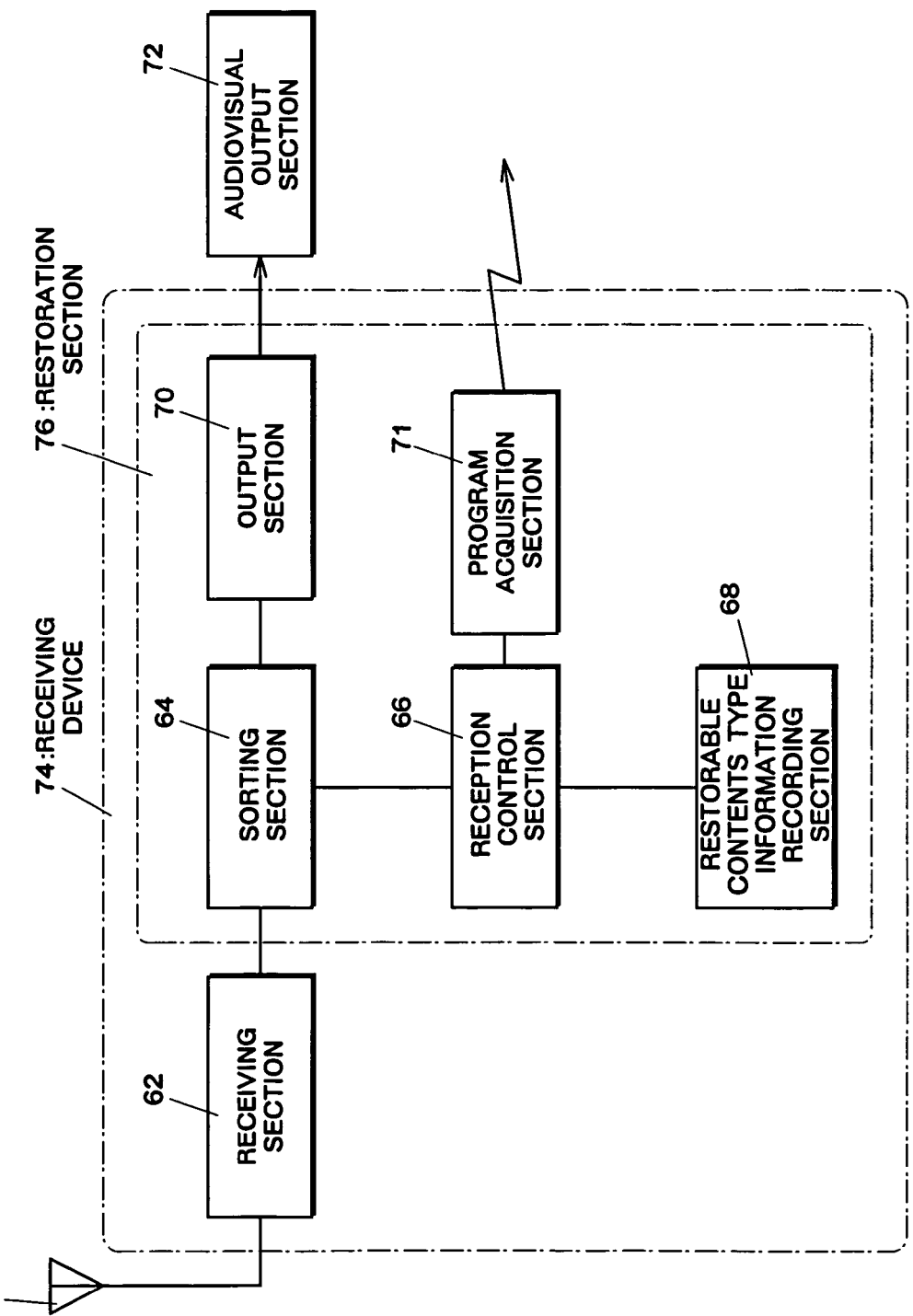
FIG. 23 is a schematic diagram illustrating the entire structure of a receiving device.

FIG. 23 is a schematic diagram illustrating the overall constitution of the receiving device 74 of this embodiment. A reception control section 66, upon determining that contents that are not restorable are present, acquires the information on the acquisition location. The reception control section 66 sends this acquisition location information to a program acquisition section 71. The program acquisition section 71 connects itself to the download site through the Internet to download a program. The reception control section 66 uses the program to restore the contents.

Figure 24:
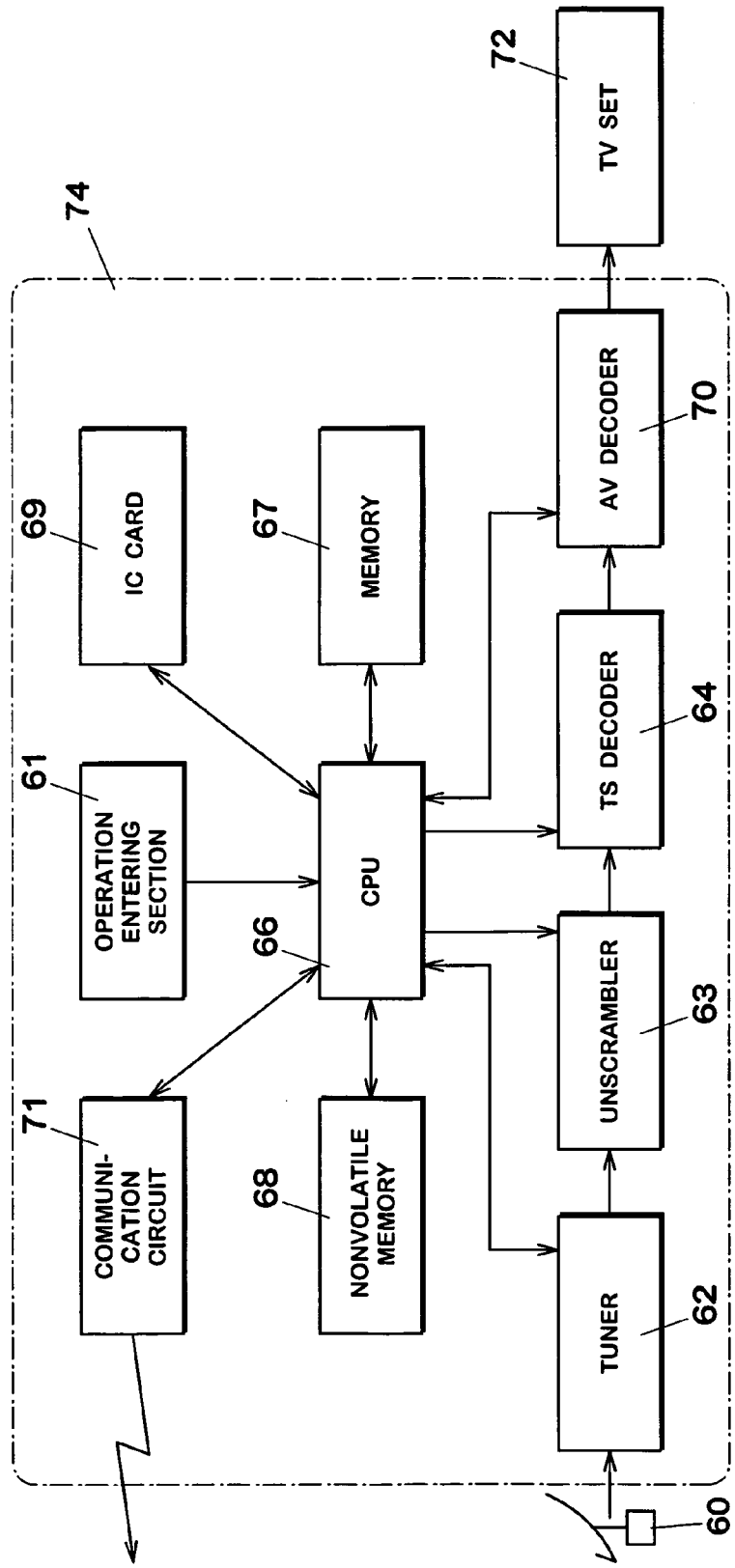
FIG. 24 is a block diagram illustrating the hardware structure of the receiving device.

FIG. 24 is a block diagram illustrating the hardware structure in which the receiving device 74 shown in FIG. 23 is realized by the use of a CPU. This embodiment is provided with a communication circuit 71 for making connection to the Internet.

FIG. 25 shows contents type information and acquisition location information sent to come on the air from the transmitting device of this embodiment. The numeral "1" in the first line is contents type information which shows that PNG data are contained in the contents. The description "http://www.mei.co.jp/PNG" is the URL (acquisition location information) of the download site of the PNG decoder program. The numeral "0" in the second line is the sign that XML data are not contained in the contents. In this case, the URL of the download site is not described. Here, the contents type information and acquisition location information may be described in the PMT and EIT similar to the first embodiment, or in the DII like in the second embodiment.

Figure 26:
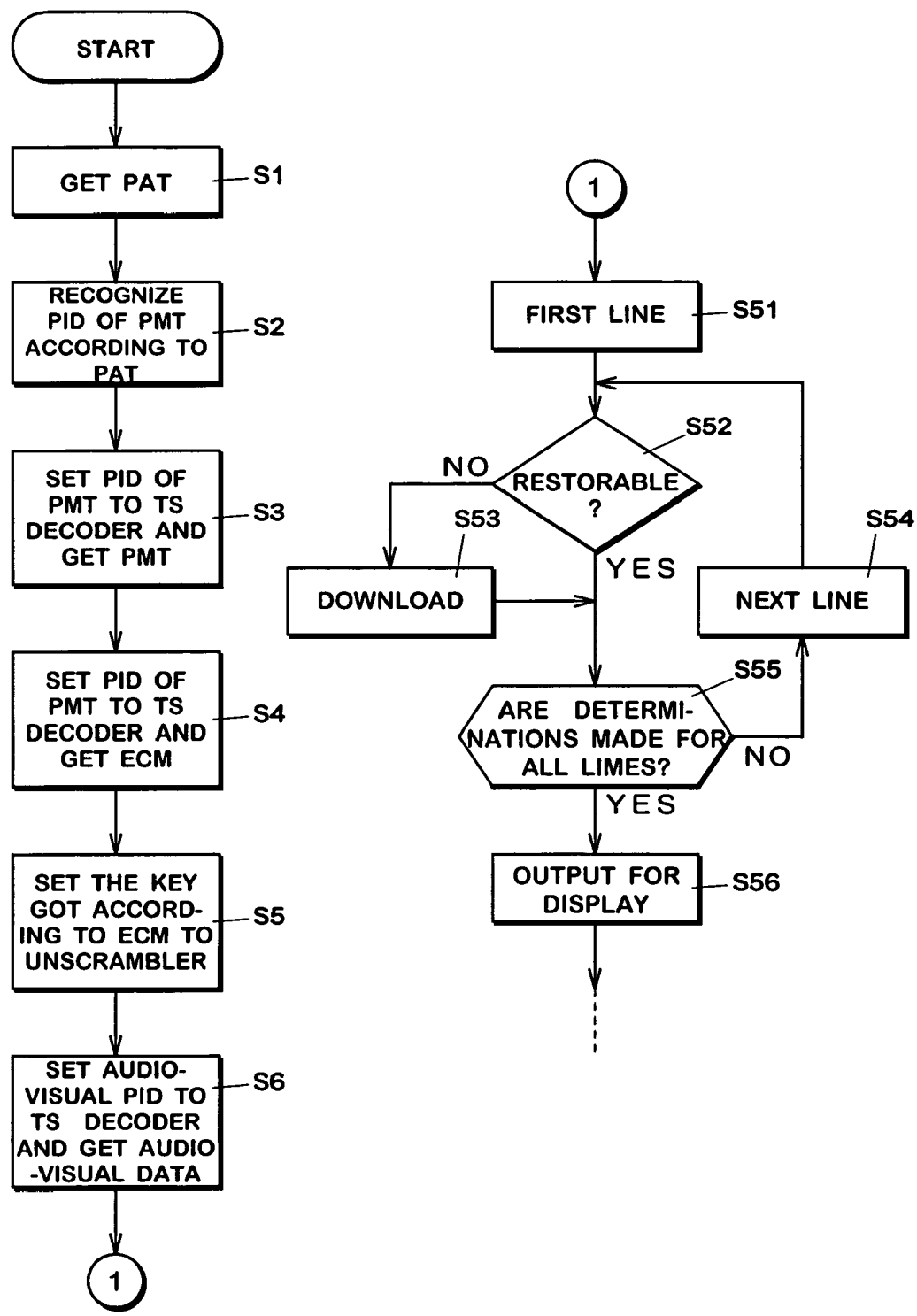
FIG. 26 is a flowchart showing the reception process.

FIG. 26 is a flowchart of the reception process program recorded in the non-volatile memory 68. Steps S1 to S6 are the same as those shown in FIG. 12. In the step S51, the CPU 66 takes note of "1" in the first line in FIG. 25, and compares it with the first of the restorable contents flag recorded in the non-volatile memory 68 (step S52). If the result determines that the contents are restorable, the next line is taken note of (step S54).

If the contents are determined not to be restorable, a URL described in correspondence with the line is acquired. The CPU 66 transfers the URL to the communication circuit 71. The communication circuit 71 connects itself to the Internet and makes access to the site of this URL to download a program (step S53). The downloaded program is recorded in the non-volatile memory 68. Here, since the contents of the type in question have become restorable by the downloading, the restorable contents type flag is updated from "0" to "1."

When the above process is completed for all the lines (step S55), the contents are outputted for display (step S56).

3.2 Other Embodiments

The above embodiment is arranged to acquire the program through the Internet. However, it may also be arranged to acquire the program through broadcast. In that case, the acquisition location information to be described can be the PMT of the service that is broadcasting the program.

4. Fourth Embodiment

This embodiment is arranged to add the necessary condition information to the acquisition location information shown in FIG. 27. The necessary condition information refers to the necessary conditions (required vacant memory capacity, etc.) on the receiving device side at the time of downloading a program. FIG. 27 shows that a minimum vacant capacity of 300 kilobyte is required for downloading the PNG decoder program.

Figure 28:
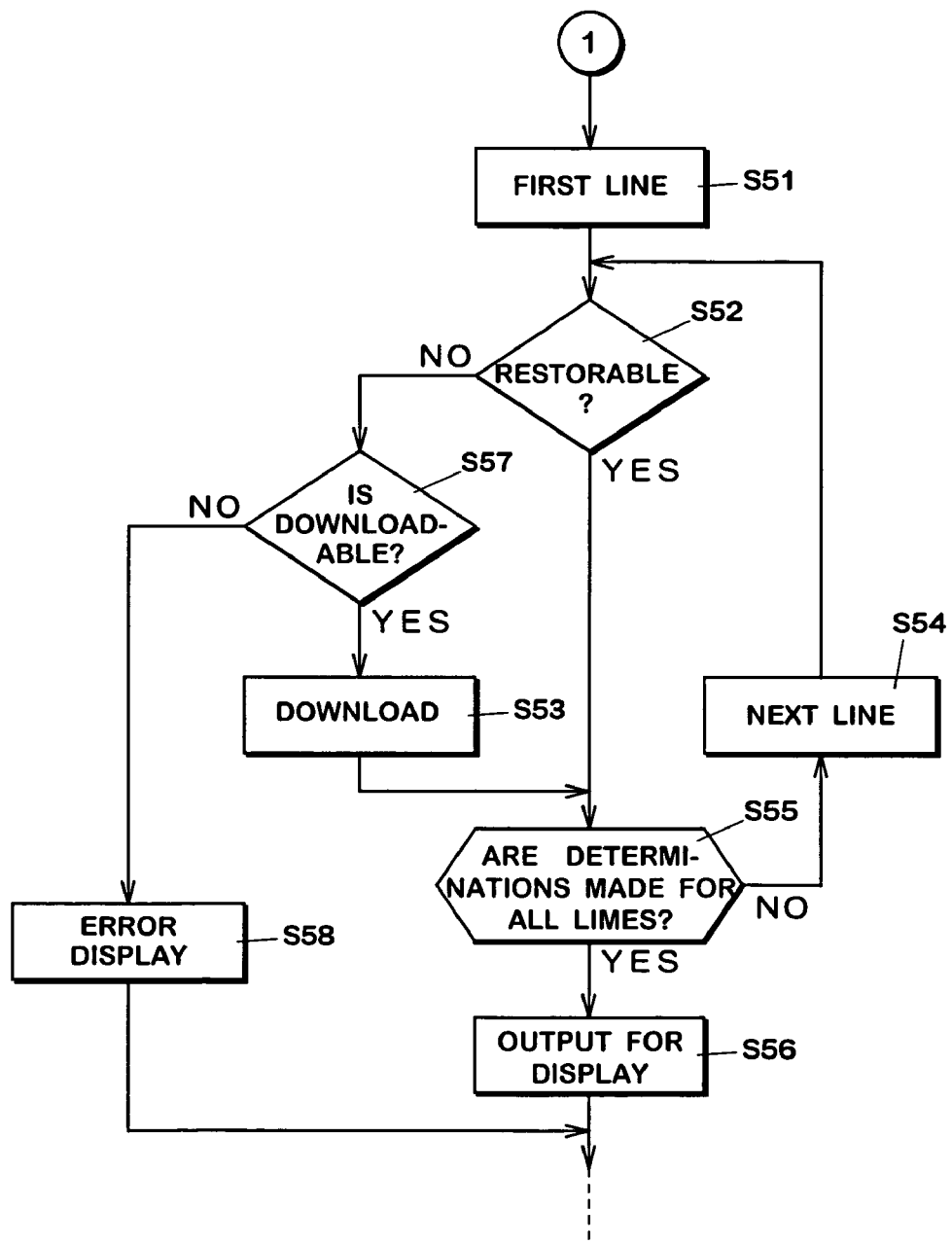
FIG. 28 is a flowchart showing the reception process.

FIG. 28 is a flowchart showing the reception process program in this embodiment. The steps S1 to S6 are the same as those shown in FIG. 26. The CPU 66 in the receiving device acquires the necessary condition information before starting the download to determine whether or not the download is possible (step S57). If the download is determined to be possible, the download is performed in the same manner as shown in FIG. 26. If determined to be impossible, an error message is displayed (step S58).

By acquiring the necessary condition information before the downloading, waste of time as with an inevitable interruption of the downloading in the middle due to insufficient memory capacity can be avoided.

While the description on the above embodiment is made about the downloading of a program when contents that are not restorable are contained therein, the method of transmitting in advance the conditions necessary for the downloading as the necessary condition information is applicable to downloading in general. For example, in the case a set of contents are once stored in the receiving device and contents selected by an operator are displayed, the method is applicable to store (or download) the set of contents.

5. Others

Although, the above description is made in relation to the satellite broadcast, the same explanation is applicable to the ground-based broadcasting, cable TV broadcast, and Internet broadcast.

While the above embodiments are described by way of broadcasting, the description may also be made in relation to a transmission-reception system of one-to-one correspondence between both transmitting and receiving devices.

Although, the present invention is described as above by way of preferable embodiments, those embodiments are not intended for restriction but for explanation, and may be modified in various ways without departing from the scope and spirit of the appended claims.

What is claimed is:

1. A digital broadcast system comprising:
    a broadcast device that multiplexes and broadcasts content and information on a type of the content, the information on the type of the content comprising indicia indicating whether or not each of a plurality of types of content elements are included in the content; and
    a receiving device that determines whether content elements included in the content are restorable based on the information on the type of the content before performing a restoration process on the content, and changes the restoration process according to the determination.

2. A broadcast device for a digital broadcast system that multiplexes and broadcasts content and information on the type of the content, the information on a type of the content being configured to allow a determination of whether content elements included in the content are restorable, and comprising indicia indicating whether or not each of a plurality of types of content elements are included in the content.

3. A receiving device for a digital broadcast system that determines whether content elements included in content are restorable based on information on a type of the content before restoring the content and changes a restoration process according to the determination, the information on the type of the content comprising indicia indicating whether or not each of a plurality of types of content elements are included in the content.

4. The receiving device of claim 3, wherein a set of content elements are repeatedly transmitted and only content elements selected from the set of content elements are restored and displayed on the receiving device.

5. The receiving device of claim 1, wherein the receiving device does not restore any of the content elements if any of a plurality of content elements contained in the content is not restorable.

6. The receiving device of claim 1, wherein if any of a plurality of content elements contained in the content is not restorable, the receiving device does not restore only the content elements that are not restorable.

7. The receiving device of claim 3, wherein, when handling information, that corresponds to the information on the type of content is transmitted from a broadcast device and the receiving device, determines on the basis of the information on the type of the content, that the content is not restorable, the receiving device determines, based on the handling information, either to restore and display the content in an incomplete state or not to restore the content at all and not to display the content.

8. The receiving device of claim 3, wherein the receiving device stores information on types of restorable content elements, and compares the stored information with information on the type of received content to determine whether the received content is restorable.

9. The digital broadcast system according to claim 1, wherein the information on the type of the content comprises a plurality of flags, each flag corresponding to a particular file type and indicating whether the content includes the particular file type.

10. A reception program for a receiving device, wherein said reception program causes said receiving device to perform operations comprising:
  determining whether content are restorable based on information on a type of the content, the information on the type of the content comprising indicia indicating whether or not each of a plurality of types of content elements are included in the content; and
  changing a process for restoring the content according to the determination.

11. A digital broadcast method for broadcasting content from a broadcasting party to at least one receiving party, comprising:
  multiplexing and broadcasting the content and information on a type of the content, the information on the type of the content comprising indicia indicating whether or not each of a plurality of types of content elements are included in the content;
  determining whether the content is restorable based on the information on the type of content before performing a restoration process on the content, and
  not performing a restoration process on the content when the content is determined not to be restorable.

12. A digital broadcast system comprising:
  a broadcast device that multiplexes and broadcasts content, information on a type of the content, and information on a location where a program for restoring the content is to be acquired, the information on the type of the content comprising indicia indicating whether or not each of a plurality of types of content elements are included in the content; and
  a receiving device that determines, before performing a restoration process on the content, whether the content is restorable based on the information on the type of the content, and if it determines that the content is not restorable, acquires the program based on the acquisition location information and performs the restoration process on the content based upon the program.

13. The digital broadcast system of claim 12, wherein the broadcast device further broadcasts information on conditions necessary for acquiring the program by the receiving device, and the receiving device determines whether or not the program can be acquired based on the necessary conditions information received.

14. A broadcast device for a digital broadcast system that multiplexes and broadcasts content, information on the type of the content, and information on a location where a program for restoring the content is to be acquired, the information on the type of the content comprising indicia indicating whether or not each of a plurality of types of content elements are included in the content.

15. The broadcast device of claim 14, wherein the device further broadcasts information on conditions necessary for acquiring the program by a receiving device.

16. A receiving device for a digital broadcast system, comprising:
  a receiver that receives content; and
  a restoration device that determines, before attempting to restore the content, whether the content is restorable based on information on a type of the content, and when not restorable, performs a restoration process on the content after acquiring a program based on acquisition location information, wherein the information on the type of the content comprising indicia indicating whether or not each of a plurality of types of content elements are included in the content.

17. The receiving device of claim 16, wherein the receiving device determines whether or not the program can be acquired on the basis of necessary condition information received.

18. The receiving device of claim 16, wherein the acquisition location information is a URL on the Internet.

19. The receiving device of claim 18, wherein the receiving device is provided with an Internet connecting section for downloading digital information.

20. The receiving device of claim 16, wherein the acquisition location information specifies the location of a program to be broadcast.

21. A method for controlling a computer comprising part of a receiving device, comprising:
  determining whether content is restorable based on information on the type of the content before performing a restoration process on the content, the information on the type of the content comprising indicia indicating whether or not each of a plurality of types of content elements are included in the content,
  and, if it is determined that the content is not restorable, acquiring a program based on acquisition location information, and performing a restoration process on the content based upon the program.

22. The method of claim 21, further comprising determining whether the program can be acquired based on necessary condition information received.

23. A digital broadcast method for broadcasting content from a broadcasting party to at least one receiving party, comprising:
  multiplexing and broadcasting the content, information on a type of the content, and information on a location where a program for restoring the content is to be acquired, the information on the type of the content comprising indicia indicating whether or not each of a plurality of types of content elements are included in the content, determining whether the content is restorable based on the information on the type of content before performing a restoration process on the content, and
  if it is determined that the content is not restorable, acquiring the program based on the acquisition location information, and performing the restoration process on the content.

24. The digital broadcast method of claim 23, further comprising broadcasting information on conditions necessary for acquiring a program,
  and determining whether the program can be acquired based on the necessary condition information received.

25. A method for communicating information, comprising:
  transmitting content together with information on a type of the content, the information on the type of the content comprising indicia indicating whether or not each of a plurality of types of content elements are included in the content,
  determining whether the content is to be restored based on the content type information and,
  not performing a restoration process on the content when it is determined that the content is not to be restored.

* * * * *